H. D. KELLY.
COFFEE URN.
APPLICATION FILED APR. 17, 1919.

1,334,497.

Patented Mar. 23, 1920.

WITNESS:

INVENTOR.
Henry D. Kelly
BY
ATTORNEY.

UNITED STATES PATENT OFFICE.

HENRY D. KELLY, OF KANSAS CITY, MISSOURI.

COFFEE-URN.

1,334,497.  Specification of Letters Patent.  Patented Mar. 23, 1920.

Application filed April 17, 1919. Serial No. 290,741.

*To all whom it may concern:*

Be it known that I, HENRY D. KELLY, a citizen of the United States, residing at Kansas City, in the county of Jackson and State of Missouri, have invented certain new and useful Improvements in Coffee - Urns, of which the following is a specification.

This invention relates to coffee urns and has for its object to produce an urn which insures the production of full strength beverage by preventing manual operation for supply or replenishing the coffee jar with water until steam has been generated in the boiler to the predetermined pressure desired to raise such water from the boiler and discharge it into the leacher and thence into the jar. A further object is to produce means whereby the manual operation of the valve for effecting such supply to or replenishment of the jar, shall close the cold water supply to the boiler and thus guard against prematurely lowering of the pressure and consequent weakening of the beverage.

With these general objects in view the invention consists in certain novel and useful features of construction and combinations of parts as hereinafter described and claimed; and in order that it may be fully understood reference is to be had to the accompanying drawing, in which:

Figure 1:
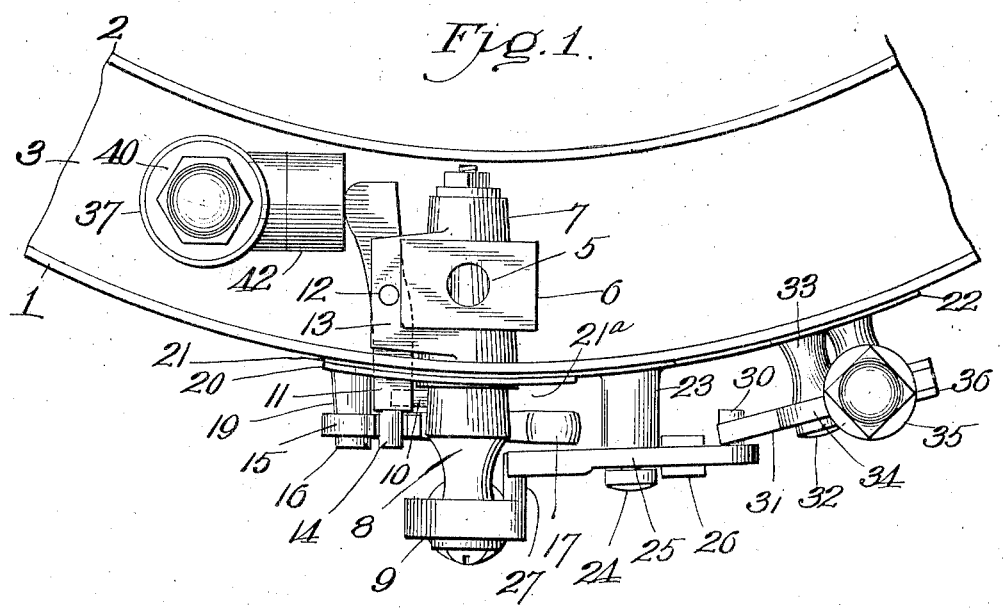
Figure 1, is a fragmentary plan view of a coffee urn with the cover omitted, equipped with mechanism embodying the invention.

In the said drawing, 1 indicates the body of the urn, 2 the beverage jar therein, and 3 a horizontal partition forming the top of the water jacket or boiler 4.

5 is a vertical pipe for communication at its lower end with the water in the boiler and for discharging such water down into the leacher, not shown, located as usual at the top of the jar 2, the drawing representing only that part of the pipe necessary to proper understanding of the present invention. The part of the pipe shown is preferably flanged at its upper end as at 6 for detachable connection with a corresponding part on the upper part of the pipe above referred to but not shown herein.

Figure 2:
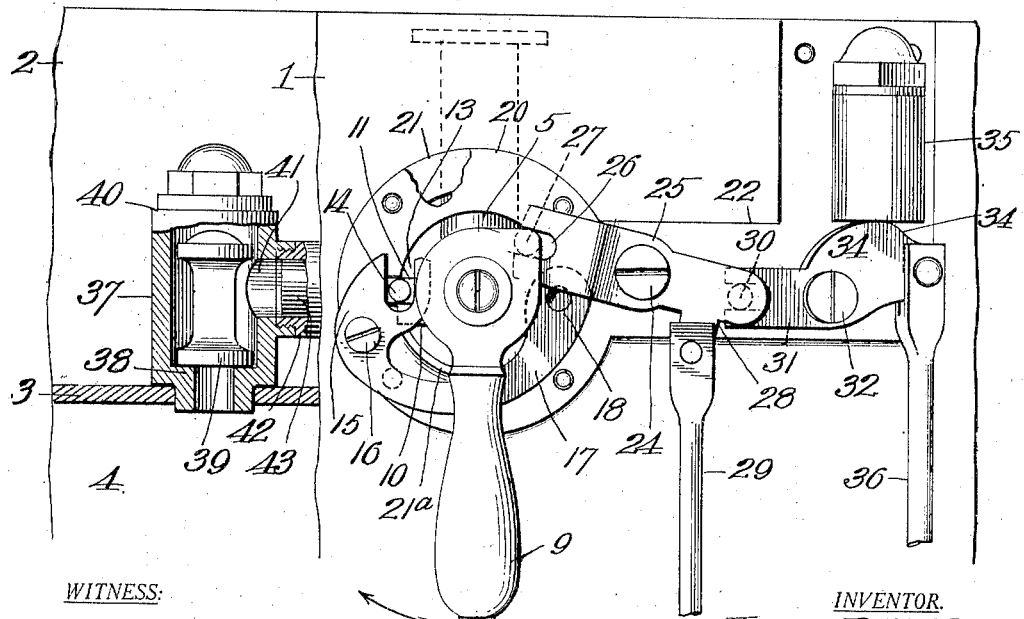
Fig. 2, is a side elevation of the upper part of the urn and with the latter broken away and with an internal part in vertical section.

Above the partition is a valve extending through the wall of the urn and comprising by preference a tapering casing 7 and a correspondingly formed plug 8, this valve controlling the passage of pipe 5. At its outer end it is provided with a handle 9 adapted to be turned a quarter revolution in the direction indicated by the arrow which appears in Fig. 2, and projecting to the left from the plug of the valve is a stop pin 10 for engagement with a locking lever 11 extending through the wall of the urn and pivoted as at 12 between a pair of ears 13 projecting laterally from the valve casing 7, the undermost of said pair of ears being hidden by other parts of the drawing, and said lever is provided at its front end with a cylindrical extension 14 engaging the notched end of a lever 15 pivoted at 16 and provided with a counter-balancing or weight arm 17, which arm at its extremity is provided with a cavity 18 for a filling of lead or the like to regulate its gravitative force in accordance with the desired steam pressure. The pivot 16 for said lever, is carried by a post 19 projecting outwardly from a cast metal ring 20 secured to another ring 21 and to the wall of the urn, and the ring 20 is provided at its lower inner margin with a lip 21ª underlying the front end of casing 7 to catch any leakage therefrom and discharge it within the urn. The ring 21 forms a part of a plate 22 provided to the right of the valve with an outwardly projecting post 23 carrying a pivot 24 upon which is mounted a rocker bar 25. Said bar is forked at one end at 26 and pivotally engages at such end, a pin 27 projecting from the head of the handle 9, whereby the operation of said handle shall effect operation of the rocker bar. At the opposite side of its pivotal point the rocker bar is provided with a depending lug 28 to which the upper end of a rod 29 is pivoted, said rod being adapted for actuating a valve, not shown, for controlling the supply of cold water to the boiler, said valve and the connection with the boiler being omitted as forming common and well-known parts of urns of the character under consideration.

The outer end of the rocker is also provided with a pin 30 pivotally engaging the bifurcated end of a lever 31 pivoted at 32 to a post 33 projecting from plate 22, and said lever is provided with a cam portion 34 for operating an air release valve 35 supported from plate 22, and adjacent said cam lever 31, is pivotally connected to the upper end of a rod 36 for operating a valve, not shown, controlling the passage of water to a vacuum inspirator, not shown.

Located in the space above the boiler is a governor casing 37 provided at the lower end with a valve seat 38 and communicating with the steam chamber of the boiler, and normally resting upon said seat to exclude steam from the casing until it has attained a predetermined pressure, is a gravity valve 39. The casing is closed at its upper end by a cap 40 and is provided at one side with an opening 41 communicating with a tubular arm 42 containing a steam-tight slidable piston 43. The arm 42 is made detachable from the casing 37 for convenience of assemblage of the latter, and by preference will be screwed into position.

Assuming that the leacher contains ground coffee and that the boiler is being charged with cold water, it will be seen that the governor valve 39 is closed and that the piston 43 is held retracted by the locking lever 11 through the pressure applied upon the latter by the counter-balancing lever 15, and that as long as the locking lever occupies the position in which it is shown, it locks plug 8 in closed position because it stands in the path of upward movement of pin 10 of said plug. When steam has been generated to the desired pressure, it successively lifts valve 39 and the usual safety valve, not shown, because conventional in coffee urns, and shortly after the safety valve is opened, the stem attains sufficient pressure to not only hold valve 39 open but to apply pressure from casing 37 sufficient to operate the piston and cause the same to overcome the resistance of the counter-balancing lever and withdraw lever 11 from the path of upward movement of the stop pin 10. When this action automatically occurs as explained, the water in the boiler is at the proper temperature to be used in making the beverage and the attendant is free to open the plug valve by swinging the handle in the direction indicated by the said arrow, this action instantly operating the rocker bar 25 to raise the rod 29 and thus close the cold water supply valve to prevent cold water entering the boiler. When the proper quantity of boiler water has been turned into the jar the plug valve is closed and thereby effects the reopening of the cold water supply valve to the boiler and a reduction in the steam pressure. The reduction in the steam pressure is instantly followed by the automatic reclosure of the valve 39 and of the safety valve mentioned, the fall of pressure having its first response however in the relocking of the plug valve under the force applied on the locking lever by the gravitative action of the counter-balancing lever, and the operation of the locking lever of course effects the return of the piston to its initial position. All subsequent operations are repetitions of those described.

The mechanism functioning as outlined, may be used on any of the standard or approved types of urns, but also may be used in conjunction with a certain vacuum urn for which application is now pending, which involves among other elements, the air release valve 35 and the rod 36 for controlling the supply of water to the vacuum inspirator, and to effect the release of air from valve 35 and upward or closing movement of the said rod when rod 29 is moved downward, the cam lever is employed in coöperation with the rocker bar 25.

From the above description it will be apparent that I have produced a coffee urn embodying the features of advantage set forth as desirable in the statement of the object of the invention, and while I have illustrated the preferred embodiment of the same, it will be apparent that it is susceptible of modification without departing from the principle of construction and mode of operation involved.

I claim:

1. In a coffee urn, a boiler, a valve-controlled pipe leading from the boiler, means for locking said valve in closed position, and steam-actuated means for unlocking said locking means.

2. In a coffee urn, a boiler, a valve-controlled pipe leading from the boiler, means for locking said valve in closed position, yielding means for holding the locking means in locked position, and steam-actuated means for unlocking said locking means.

3. In a coffee urn, a boiler, a valve-controlled pipe leading from the boiler, means for locking said valve in closed position, a casing communicating with the steam chamber of the boiler, and a piston for actuation by steam at a predetermined pressure within said casing to unlock said locking means.

4. In a coffee urn, a boiler, a valve-controlled pipe leading from the boiler, means for locking said valve in closed position, a casing communicating with the steam chamber of the boiler, a piston for actuation by steam at a predetermined pressure within said casing to unlock said locking means, and automatic means for relocking the valve in closed position when the steam pressure in said steam casing falls below a predetermined pressure.

5. In a coffee urn, a boiler, a valve-controlled pipe leading from the boiler, means for locking said valve in closed position, steam-actuated means for unlocking said locking means, a casing communicating with the steam chamber of the boiler, a gravity valve normally closing said casing to the entrance of steam, a piston accessible to steam when it enters said casing and adapted under a predetermined pressure of said steam to unlock said locking means, and yielding means to relock said valve in closed position when the steam falls below a predetermined pressure.

6. In a coffee urn, a boiler, a pipe leading from the boiler, a manually operable valve controlling said pipe and provided with a stop on its movable part, a locking lever intercepting the path of said pin in the unlocking movement of the valve, and steam-actuated means for unlocking said locking lever.

7. In a coffee urn, a boiler, a pipe leading from the boiler, a manually operable valve controlling said pipe and provided with a stop on its movable part, a locking lever intercepting the path of said pin in the opening movement of the valve, a counter-balancing lever engaging and holding said locking lever in locked position and for returning it to such position, and steam-actuated means for overcoming the resistance of said counter-balancing lever to withdraw the locking lever from the path of said pin to leave the valve free to be opened.

8. In a coffee urn, a boiler, a pipe communicating with the boiler, a manually operable valve controlling said pipe, means for locking said valve in closed position, a rod, means for transmitting power from the movable part of said valve to said rod to operate the same in one direction or the other according to the operation of the valve, and steam-actuated means for unlocking the valve to permit the same to be opened and said rod to be operated.

9. In a coffee urn, a boiler, a pipe communicating with the boiler, a manually operable valve controlling said pipe, means for locking said valve in closed position, a rod, means for transmitting power from the movable part of said valve to said rod to operate the same in one direction or the other according to the operation of the valve, steam-actuated means for unlocking the valve to permit the same to be opened and said rod to be operated, and yielding means for relocking said locking means when the steam pressure falls below a predetermined point.

In testimony whereof I affix my signature.

HENRY D. KELLY.